United States Patent Office 3,647,812
Patented Mar. 7, 1972

3,647,812
HALOGENATED 2(2'-HYDROXYPHENYL) BENZOTHIAZOLES
Richard F. Smith, 5 Courtney Court, Easton, Pa. 18042
No Drawing. Filed Apr. 22, 1969, Ser. No. 818,414
Int. Cl. C07d 11/44
U.S. Cl. 260—304                    18 Claims

ABSTRACT OF THE DISCLOSURE

Halogenated derivatives of 2(2'-hydroxyphenyl) benzothiazole having the formula:

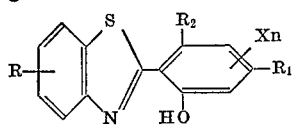

wherein R represents hydrogen, SO$_3$H, alkyl, aryl, cycloalkyl, hydroxy or halogeno; R$_1$ and R$_2$ individually represent hydrogen, hydroxy or X, X represents a halogen such as chloro, fluoro, bromo and iodo and $n$ represents the integer 1 or 2 such derivatives being water insoluble fluorescent compounds fluorescing with a green to yellow hue.

---

The instant invention is directed to novel benzothiazole derivatives. In particular the instant invention is directed to novel halogenated 2(2'-hydroxyphenyl) benzothiazoles.

The novel compounds of the instant invention have the general formula:

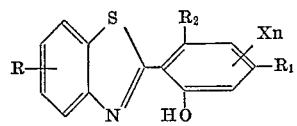

wherein R represents hydrogen, SO$_3$H, alkyl, aryl, cycloalkyl hydroxy or halogeno; R$_1$ and R$_2$ individually represent hydrogen hydroxy or X, X represents a halogen such as chloro, fluoro, bromo and iodo and $n$ represents the integer 1 or 2.

The instant invention is further directed to the preparation of fluorescent organic compounds which compounds fluoresce with a green to yellow hue. Those compounds which have previously been employed have been found to be exceedingly expensive and a suitable inexpensive substitute therefore has been sought for an extensive period of time.

Therefore, it is an object of the instant invention to provide new and novel halogenated benzothiazole compounds.

Another object of the instant invention is to provide novel halogenated derivatives of 2(2' - hydroxyphenyl) benzothiazoles.

A still further object of the instant invention is to provide novel organic compounds which fluoresce with a green to yellow hue.

These and other objects of the instant invention will become more evident from the following more detailed discussion thereof.

The novel compounds of the instant invention may be represented by the general formula:

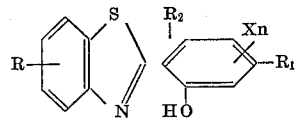

There are numerous suitable alkyl radicals which may be employed for the substituent R, which radicals include but are not limited to:

| | | |
|---|---|---|
| Methyl | Nonyl | Heptadecyl |
| Ethyl | Decyl | Octadecyl |
| Propyl | Undecyl | Nonadecyl |
| Butyl | Dodecyl | Elcosyl |
| Pentyl | Tridecyl | Docosyl |
| Hexyl | Tetradecyl | Tricosyl |
| Heptyl | Pentadecyl | Pentacosyl |
| Octyl | Hexadecyl | Triacontyl |

Suitable cycloalkyl radicals include but are not limited to:

| | | |
|---|---|---|
| Cyclopentyl | Cycloheptyl | Cyclooctyl |
| Cyclohexyl | Cyclononyl | |

Suitable halogeno radicals include but are not limited to:

| | |
|---|---|
| Chloro | Fluoro |
| Bromo | Iodo |

Suitable aryl radicals include but are not limited to phenyl, and the various substituted aromatic radicals including the alkyl, alkoxy, halo, carboxy, carboxyalkoxyacyl, and acyl amino derivatives.

The compounds of the instant invention may be prepared by condensing o-aminobenzenthiol with a particular salicylic acid in the presence of phosphorus acid chloride or phosphorus trichloride. A method of this type is disclosed in our copending application, Ser. No. 690,376. In this type of reaction, i.e. a phosphazo reaction, the o-aminobenzenethiol is condensed with an appropriate salicylic acid in the presence of phosphorus trichloride. It is thought that the aromatic amine first reacts with the phosphorus trichloride to form a phosphazo intermediate which intermediate subsequently reacts with the aromatic carboxylic acid to produce the anilide. This type of phosphazo reaction is generally carried out in the presence of an organic solvent.

In general, the solvent that is employed is selected from organic aromatic materials and organic aromatic amines such as benzene, toluene, ortho, meta and paraxylene, dimethyl aniline and the like. The organic hydrocarbon solvents and in particular toluene and the organic aromatic amines such as dimethyl aniline are the preferred solvents for use in the preparation of the novel compounds of the instant invention. It has been found that the above two denoted solvents, result in a slightly higher yield of the desired compounds as compared to other similar solvents which may be employed. The amount of solvent employed in the preparation of the instant compounds is in no way critical and an excess thereof may be employed and such an excess does not interfere with the reaction or adversely affect the yield of purity of the product therefrom. The solvent that is employed in the system is readily removed from the reaction system subsequent to the completion of the reaction by conventional solvent removal process.

The process employed in the preparation of the instant compounds is generally carried out in two stages or steps. The first step in the reaction, i.e. the reaction of the o-aminobenzenethiol and phosphorus trichloride is exothermic and is generally carried out at a temperature from about 40° to 80° C. and preferably in a temperature of about 60° C. with external cooling. In this step the phosphazo intermediate is prepared by the reaction of phosphorus trichloride with the o-aminobenzenethiol. The second stage of the reaction between the phosphazo intermediate and the salicylic acid derivative is generally carried out in an elevated temperature from about 90° to about 120° C. and preferably from about 105° to 110° C. The temperature employed is near the boiling point of toluene and thus reflux conditions can be utilized. It has been found that if one carries out both steps at an elevated temperature, an inferior product in low yield is produced. The process employed in connection with the instant invention can be carried out either by employing a single reaction vessel, initially kept at about 40° to 80° C. with a subsequent raising of the temperature of reaction to the higher temperature of 90° to 120° C. or the process may be conducted in two separate reaction vessels. If the process is conducted in two separate reaction vessels, the product of the first reaction conducted at a lower temperature is completely removed and passed into the second vessel at a higher temperature in order to conduct the second step or stage of the reaction.

The reactants employed in the process delineated above are in substantially stoichiometric amounts, although it is also possible to employ an excess of either of the reactants. That is to say that if one employs a stoichiometric excess of either of the reactants, the reaction product, purity, or yield of the reaction is not adversely affected.

The catalyst involved in the reaction employed to prepare the novel compounds of the instant invention is a catalyst comprising phosphorus trichloride. The amount of phosphorus trichloride employed may vary greatly from about 0.5 mole to about 2 moles of phosphorus trichloride per mole of o-aminobenzenethiol or derivatives thereof. Preferably the phosphorus trichloride catalyst and the o-aminobenzenethiol or derivative are employed in substantially equal molar amounts. It is of course obvious that the lesser or greater amounts of catalyst can be employed where desired for specific purposes.

It has unexpectedly been found that the substitution in the 2'-position of 2-phenylbenzothiazoles with a hydroxy substituent results in a marked enhancement of the fluorescent characteristics of the resultant compounds. It is believed that the intensity of the fluorescence of these compounds as compared to those without a 2'-hydroxy substituent is due in part to an intramolecular hydrogen bonding which results in an increased coplanarity and therefore an enhanced fluorescence. This may be depicted by reference to the following formula, in which the intramolecular hydrogen bonding is depicted.

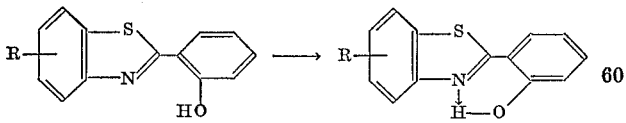

This effect may be further illustrated by comparison of the absolute value of fluorescence of the numerous hydroxy substitutions possible on the phenyl ring of these benzothiazoles. That is to say, if one substitutes a hydroxy substituent in the 2'-position, one obtains a brightness number of 41. If however, one substitutes the hydroxy substituent in either the 3'- or 4'-positions, one obtains a brightness number of 6 and 11 respectively which variation in fluorescent values clearly indicates the unexpected nature of the instant invention. Furthermore, a visual observation of the compounds of the instant invention indicates that the 2'-substituted compound, i.e. 2(2'-hydroxyphenyl)benzothiazole fluoresces with an intense green fluorescence, whereas the 2(3'-hydroxyphenyl) benzothiazole and the 2(4'-hydroxyphenyl)benzothiazole fluoresces with a weak orange fluorescence and a barely perceptible orange fluorescence respectively. The substitution of the halogeno radicals in the 3'- or 5'-positions result in an increase in the intensity of the fluorescence in the green-yellow range, that is to say, that when the halogeno radicals are substituted in either the ortho or para positions relative to the hydroxy radical a compound which fluoresces with an intense green or yellow results. This is clearly demonstrated by a comparison of the brightness values of the 2(2'-hydroxyphenyl)benzothiazole of 37 as compared with a brightness value of 45 for the 2(2' - hydroxy-5'-chlorophenyl)benzothiazole which clearly indicates the increased intensity of fluorescence obtained by halogen substitution.

The compounds of the instant invention are all water-insoluble. It is noted, however, that they can be solubilized by an appropriate sulfonation process as described in the copending application of H. B. Freyermuth, Ser. No. 690,791, filed Dec. 15, 1967, and now U.S. Patent No. 3,491,106 dated Jan. 20, 1970, or by another appropriate sulfonation process many of which are known in the art.

Examples of the compounds of the instant invention include, but are not limited to the following:

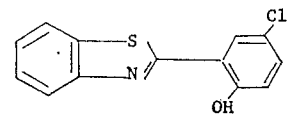

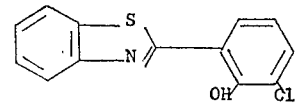

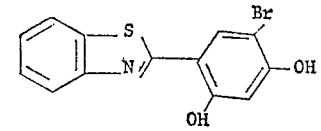

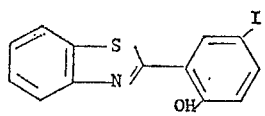

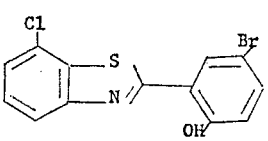

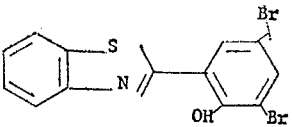

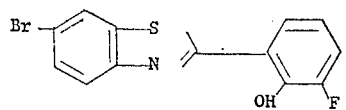

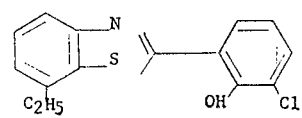

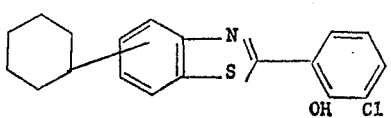
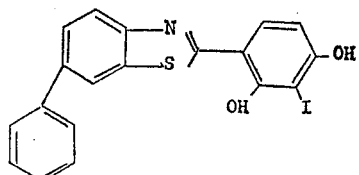
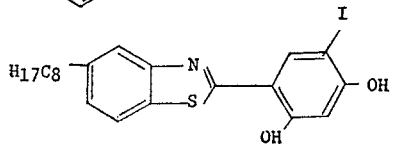
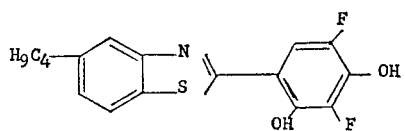
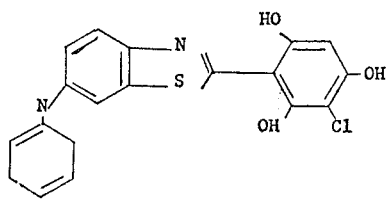
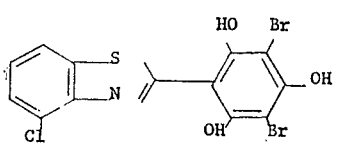
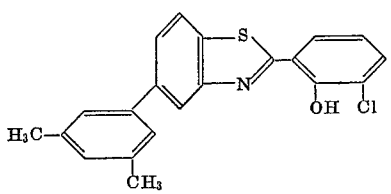
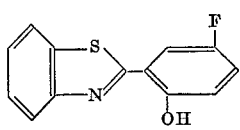
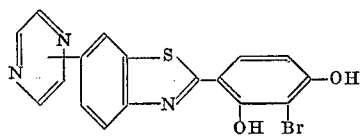
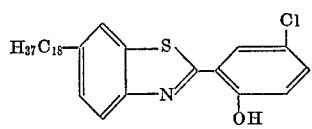
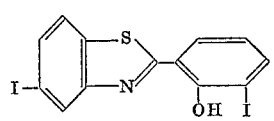

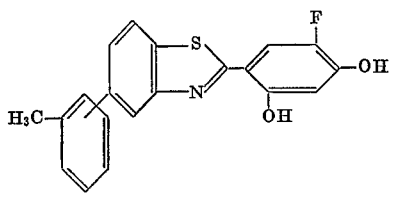

The instant invention will now be explained in more detail by reference to the following examples.

EXAMPLE I

2(2'-hydroxy-5'-chlorophenyl)benzothiazole was prepared according to the following reaction process.

69 g. of 5-chlorosalicylic acid was reacted with 50 g. of o-aminobenzenethiol in 500 ml. toluene. The reaction mixture was stirred and heated so as to dissolve the reactants and subsequently cooled to 60° C. 17.5 ml. of phosphorus trichloride was then added and the reaction mixture was heated to reflux for 6 hours. At the end of this time the desired product precipitated and said product was filtered and air dried.

EXAMPLE II

2(2',4' - dihydroxy-5'-bromophenyl)benzothiazole was prepared according to the following process.

47 g. of 5-bromo-2,4-dihydroxy benzoic acid was reacted with 25 g. of o-aminobenzenethiol in 500 ml. dimethylaniline. The reaction mixture was stirred and heated so as to dissolve the reactants and subsequently cooled to 60° C. 15 ml. phosphorus trichloride was then added and the reaction mixture was heated at 60° C. for 6 hours. At the end of this time the desired product precipitated and said product was filtered and air dried.

EXAMPLE III

2(2' - hydroxy-3'-iodophenyl)benzothiazole was prepared by reacting 3-iodosalicyclic acid with o-aminobenzenethiol according to the process of Example I. At the end of 5 hours the desired product was precipitated and said product was filtered and air dried.

EXAMPLE IV

2(2',4',6'-trihydroxy - 3',5' - dichlorophenyl)benzothiazole was prepared by reacting 3,5-dichloro-2,4,6-trihydroxy benzoic acid with o-aminobenzenethiol according to the process of Example I. At the end of 5 hours the desired product precipitated and said product was filtered and air dried.

EXAMPLE V

2(2' - hydroxy-3'-fluorophenyl)benzothiazole was prepared by reacting 3-fluorosalicylic acid with o-aminobenzenethiol according to the process of Example I. At the end of 4 hours the desired product precipitated and said product was filtered and air dried.

EXAMPLE VI

2(2' - hydroxy-3',5'-difluorophenyl)benzothiazole was prepared by reacting 3,5-difluorosalicylic acid with o-aminobenzenethiol according to the process of Example I. At the end of 6 hours the desired precipitated and said product was filtered and air dried.

What is claimed is:

1. Halogenated derivatives of 2(2'-hydroxyphenyl) benzothiazole having the formula

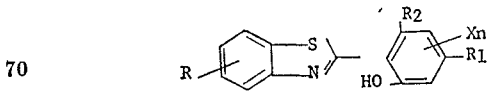

wherein R is selected from the group consisting of $SO_3H$, $C_1$-$C_{30}$ alkyl, phenyl, $C_{5-9}$ cycloalkyl, hydroxy, and halogeno; $R_1$ and $R_2$ are individually selected from the group consisting of hydrogen, hydroxy and X, X as chloro, fluoro, bromo and iodo and $n$ represents the integer 1 or 2.

2. The compound of claim 1 wherein R, $R_1$ and $R_2$ represent hydrogen, and X represents chloro and $n$ is the integer 1.

3. The compound of claim 1 wherein R, $R_1$ and $R_2$ represent hydrogen, and X represents bromo and $n$ is the integer 1.

4. The compound of claim 1 wherein R, $R_1$ and $R_2$ represent hydrogen, and X represents fluoro and $n$ is the integer 1.

5. The compound of claim 1 wherein R, $R_1$ and $R_2$ represent hydrogen, and X represents iodo and $n$ is the integer 1.

6. The compound of claim 1 wherein R, $R_1$ and $R_2$ represent hydrogen, and X represents chloro and $n$ is the integer 2.

7. The compound of claim 1 wherein R, $R_1$ and $R_2$ represent hydrogen, and X represents fluoro and $n$ is the integer 2.

8. The compound of claim 1 wherein R, $R_1$ and $R_2$ represent hydrogen, and X represents iodo and $n$ is the integer 2.

9. The compound of claim 1 wherein R, $R_1$ and $R_2$ represent hydrogen, and X represents bromo and $n$ is the integer 2.

10. The compound of claim 1 wherein R and $R_1$ represent hydrogen, $R_2$ represents hydroxy, X represents chloro and $n$ represents the integer 1.

11. The compound of claim 1 wherein R and $R_1$ represent hydrogen, $R_2$ represents hydroxy, X represents fluoro and $n$ represents the integer 1.

12. The compound of claim 1 wherein R and $R_1$ represent hydrogen, $R_2$ represents hydroxy, X represents bromo and $n$ represents the integer 1.

13. The compound of claim 1 wherein R and $R_1$ represent hydrogen, $R_2$ represents hydroxy, X represents iodo and $n$ represents the 1.

14. The compound of claim 1 wherein R and $R_1$ represent hydrogen, $R_2$ represents hydroxy, X represents chloro and $n$ represents the integer 2.

15. The compound of claim 1 wherein R and $R_1$ represent hydrogen, $R_2$ represents hydroxy, X represents fluoro and $n$ represents the integer 2.

16. The compound of claim 1 wherein R and $R_1$ represent hydrogen, $R_2$ represents hydroxy, X represents bromo and $n$ represents the integer 2.

17. The compound of claim 1 wherein R and $R_1$ represent hydrogen, $R_2$ represents hydroxy, X represents iodo and $n$ represents the integer 2.

18. The compound of claim 1 wherein R represents hydrogen, $R_1$ and $R_2$ represent hydroxy, X represents chloro and $n$ represents integer 1.

References Cited

UNITED STATES PATENTS 3,491,106    1/1970    Freyermuth _____ 260—304

ALEX MAZEL, Primary Examiner

R. J. GALLAGHER, Assistant Examiner

U.S. Cl. X.R.

22—301.2

PO-1050
(5/69)

UNITED STATES PATENT OFFICE
CERTIFICATE OF CORRECTION

Patent No. 3,647,812      Dated March 7, 1972

Inventor(s) Richard F. Smith

It is certified that error appears in the above-identified patent and that said Letters Patent are hereby corrected as shown below:

Column 1, line 4, before "No Drawing", insert -- assignor to GAF Corporation - --; line 38, before "hydroxy", insert a comma, and line 39, before "hydroxy", insert a comma; column 6, line 72, after "SO$_3$H," read -- H, --.

Signed and sealed this 1st day of August 1972.

(SEAL)
Attest:

EDWARD M. FLETCHER, JR.      ROBERT GOTTSCHALK
Attesting Officer      Commissioner of Patents